(12) United States Patent
Li et al.

(10) Patent No.: US 11,487,324 B2
(45) Date of Patent: Nov. 1, 2022

(54) DISPLAY DEVICE, CONTROL METHOD THEREFOR, AND HEAD-MOUNTED VIRTUAL DISPLAY DEVICE

(71) Applicants: Beijing BOE Optoelectronics Technology Co., Ltd., Beijing (CN); BOE Technology Group Co., Ltd., Beijing (CN)

(72) Inventors: Ke Li, Beijing (CN); Hao Zhang, Beijing (CN); Yali Liu, Beijing (CN); Ruijun Dong, Beijing (CN); Chenru Wang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 92 days.

(21) Appl. No.: 16/976,510

(22) PCT Filed: Dec. 25, 2019

(86) PCT No.: PCT/CN2019/128312
§ 371 (c)(1),
(2) Date: Aug. 28, 2020

(87) PCT Pub. No.: WO2020/140811
PCT Pub. Date: Jul. 9, 2020

(65) Prior Publication Data
US 2021/0048840 A1    Feb. 18, 2021

(30) Foreign Application Priority Data

Jan. 2, 2019   (CN) .......................... 201910002502.0

(51) Int. Cl.
*G06F 1/16*      (2006.01)

(52) U.S. Cl.
CPC ................................... *G06F 1/163* (2013.01)

(58) Field of Classification Search
CPC ....... G06F 1/163; G06F 3/147; G06T 3/4069; G09G 3/007; G09G 3/20;
(Continued)

(56) References Cited

U.S. PATENT DOCUMENTS 9,880,441 B1 *   1/2018   Osterhout ............... G02F 1/153
2008/0259233 A1  10/2008  Krijn et al.
(Continued)

FOREIGN PATENT DOCUMENTS

CN         1959779 A     5/2007
CN       200997230 Y    12/2007
(Continued)

OTHER PUBLICATIONS

Office Action for corresponding Chinese Application 201910002502.0 dated Feb. 26, 2020.
(Continued)

*Primary Examiner* — Rockshana D Chowdhury
(74) *Attorney, Agent, or Firm* — ArentFox Schiff LLP; Michael Fainberg

(57)    ABSTRACT

A display device includes a base substrate, a display panel, and a moveable structure located between the base substrate and the display panel, fixedly connected to the display panel and slidably connected to the base substrate; the display panel includes pixel areas and non-pixel areas between the pixel areas; in displaying phase, the moveable structure is configured to control the display panel to perform reciprocating motion with a preset cycle, the distance that the display panel moves in a single direction in the preset cycle is smaller than or equal to the width of a non-pixel area in the single direction, the preset cycle is the time required for the display panel to perform reciprocating motion once, and
(Continued)

the time that the display panel moves in the single direction in the preset cycle is equal to the time that an image of the display panel is refreshed once.

16 Claims, 3 Drawing Sheets

(58) Field of Classification Search
CPC ....... G09G 2340/0464; G09G 2340/14; G09G 2340/16; G02B 30/24; G02B 30/31; G02B 27/0172; G02B 27/0176; G02B 2027/0154; G02F 1/133512; G02F 1/1309
See application file for complete search history.

(56) References Cited

U.S. PATENT DOCUMENTS

| | | | |
|---|---|---|---|
| 2009/0052027 A1 | 2/2009 | Yamada et al. | |
| 2012/0056909 A1 | 3/2012 | Shih et al. | |
| 2012/0176296 A1* | 7/2012 | Border | G02B 27/017 345/8 |
| 2013/0278631 A1* | 10/2013 | Border | G06Q 30/02 345/633 |
| 2014/0198017 A1* | 7/2014 | Lamb | G02B 27/017 345/8 |
| 2015/0031292 A1* | 1/2015 | Holman | H04B 7/26 455/41.2 |
| 2015/0168722 A1* | 6/2015 | Cho | G06F 1/163 345/156 |
| 2016/0007925 A1* | 1/2016 | Mirov | A61B 5/489 356/400 |
| 2016/0037625 A1* | 2/2016 | Huitema | H05K 5/0017 361/749 |
| 2016/0317056 A1* | 11/2016 | Moon | G06F 3/013 |
| 2018/0103903 A1* | 4/2018 | Tzvieli | G01J 5/0205 |
| 2018/0136468 A1* | 5/2018 | Son | G02B 27/4244 |
| 2018/0180894 A1* | 6/2018 | Pombo | G06F 1/163 |
| 2019/0139484 A1 | 5/2019 | Zeng et al. | |
| 2019/0311665 A1 | 10/2019 | Liu | |

FOREIGN PATENT DOCUMENTS

| | | | | |
|---|---|---|---|---|
| CN | 101341763 A | | 1/2009 | |
| CN | 101387756 A | | 3/2009 | |
| CN | 102368375 A | | 3/2012 | |
| CN | 102376236 A | * | 3/2012 | |
| CN | 102376236 A | | 3/2012 | |
| CN | 102890897 A | | 1/2013 | |
| CN | 105980952 A | * | 9/2016 | .......... G04G 17/045 |
| CN | 107909963 A | | 4/2018 | |
| CN | 108259882 A | | 7/2018 | |
| CN | 109581665 A | | 4/2019 | |
| EP | 3415975 A1 | * | 12/2018 | ............. G06F 1/163 |
| KR | 20180016061 A | | 2/2018 | |

OTHER PUBLICATIONS

Office Action for corresponding Chinese Application 201910002502.0 dated Nov. 3, 2020.

* cited by examiner

DISPLAY DEVICE, CONTROL METHOD THEREFOR, AND HEAD-MOUNTED VIRTUAL DISPLAY DEVICE

The present disclosure is a national phase entry under 35 U.S.C. § 371 of International Application No. PCT/CN2019/128312, filed on Dec. 25, 2019, which claims priority to Chinese Patent Application No. 201910002502.0, filed with the China National Intellectual Property Administration (CNIPA) on Jan. 2, 2019 and entitled "Display Device, Display Method Therefor and Head-Mounted Virtual Display Device", the entire contents of which are incorporated herein by reference.

FIELD

The present disclosure relates to the technical field of display and in particular to a display device, a control method therefor and a head-mounted virtual display device.

BACKGROUND

As an emerging entertainment electronic device, virtual reality (VR) device may provide users with sensory simulation on visual sense, hearing sense, touch sense, etc., make the users feel as if they are in the scene and make the users observe things in a three-dimensional space without limitations in time, thus the VR device is pursued by a great number of users.

SUMMARY

On the first aspect, embodiments of the present disclosure provide a display device including a base substrate, a display panel located over the base substrate, and a moveable structure located between the base substrate and the display panel. The moveable structure is fixedly connected with the display panel and is slidably connected with the base substrate; the display panel includes a plurality of pixel areas and non-pixel areas located between the pixel areas.

The moveable structure is configured to control the display panel to do reciprocating motion with a preset cycle while the display panel performs displaying, and a distance that the display panel moves in a single direction in the preset cycle is smaller than or equal to a width, in the single direction, of each of the non-pixel areas.

The preset cycle is time spent by the display panel to do reciprocating motion once, and time that the display panel moves in the single direction in the preset cycle is equal to time that an image of the display panel is refreshed once.

In one possible implementation way, in the above-mentioned display device provided by some embodiments of the present disclosure, a width of each of the pixel areas is greater than or equal to the width of each of the non-pixel areas.

In one possible implementation way, in the above-mentioned display device provided by some embodiments of the present disclosure, the distance that the display panel moves in the single direction in the preset cycle is smaller than or equal to a distance from a center of a pixel area to a center of a non-pixel area adjacent to the pixel area.

In one possible implementation way, in the above-mentioned display device provided by some embodiments of the present disclosure, the moveable structure is connected with the base substrate by a dovetail clamping slot.

In one possible implementation way, in the above-mentioned display device provided by some embodiments of the present disclosure, the moveable structure is in rigid connection with the display panel.

In one possible implementation way, in the above-mentioned display device provided by some embodiments of the present disclosure, the moveable structure includes a piezoelectric ceramic motor.

On the second aspect, embodiments of the present disclosure further provide a head-mounted virtual display device including the above-mentioned display device provided by embodiments of the present disclosure.

In one possible implementation way, the above-mentioned head-mounted virtual display device provided by some embodiments of the present disclosure further includes a control unit connected with the moveable structure and a chip connected with the control unit.

The chip is configured to send a motion instruction.

The control unit is configured to receive the motion instruction and control the moveable structure to do reciprocating motion with the preset cycle in response to the motion instruction.

On the third aspect, embodiments of the present disclosure further provide a method for controlling the display device, including: in a display phase, controlling the display panel to do reciprocating motion with a preset cycle.

The distance that the display panel moves in a signal direction in the preset cycle is smaller than or equal to a width, in the single direction, of each of the non-pixel areas. The preset cycle is the time spent by the display panel to do reciprocating motion once, and the time that the display panel moves in the single direction in the preset cycle is equal to the time that the image of the display panel is refreshed once.

In one possible implementation way, in the above-mentioned method provided by some embodiments of the present disclosure, the display panel is controlled to do linear reciprocating motion along a first direction and a direction opposite to the first direction with the preset cycle.

In one possible implementation way, in the above-mentioned method provided by some embodiments of the present disclosure, the preset cycle is twice as long as the time that the image of the display panel is refreshed once.

In one possible implementation way, in the above-mentioned method provided by some embodiments of the present disclosure, the display panel is controlled to do reciprocating motion along a closed region formed by a first direction, a second direction, a direction opposite to the first direction and a direction opposite to the second direction with the preset cycle.

In one possible implementation way, in the above-mentioned method provided by some embodiments of the present disclosure, the preset cycle is four times as long as the time that the image of the display panel is refreshed once.

In one possible implementation way, in the above-mentioned method provided by some embodiments of the present disclosure, the distance that the display panel moves in the single direction in the preset cycle is smaller than or equal to a distance from a center of a pixel area to a center of a non-pixel area adjacent to the pixel area.

In one possible implementation way, in the above-mentioned method provided by some embodiments of the present disclosure, the preset cycle is 10 ms or 20 ms.

In one possible implementation way, in the above-mentioned method provided by some embodiments of the present disclosure, the time that the image is refreshed once ranges from 8.3 ms to 16.7 ms.

DETAILED DESCRIPTION OF THE EMBODIMENTS

In the related art, a display image of a VR device is directly related to an effect of the display image used by a user. In the display of a VR head-mounted device, the exquisite level of image display is limited by a pixel size of a display module, and at present, the pixel size of a module configured to perform VR displaying is far from a resolution ratio of human eyes, so that the user may see pixel grids, namely a screen door effect, when using the VR device, and thus, an experience effect is affected.

Therefore, how to eliminate the screen door effect appearing when the VR device performs displaying is a technical problem to be urgently solved by those skilled in the art.

For the above-mentioned problems existing in the VR device in the related art, embodiments of the present disclosure provide a display device, a method for controlling the display device and a head-mounted virtual display device. In order to make objectives, technical solutions and advantages of the present disclosure clearer, the specific embodiments of the display device, the method for controlling the display device and the head-mounted virtual display device will be illustrated in detail below in conjunction with accompanying drawings. It should be understood that the preferred embodiments described below are merely configured to illustrate and explain the present disclosure, rather than to limit the present disclosure. Furthermore, the embodiments in the present application and features in the embodiments may be combined with each other without conflicts.

The thickness, size and shape of each layer of a film in the accompanying drawings are only intended to schematically describe the content of the present disclosure, rather than to reflect a true proportion of the display device.

Figure 1:
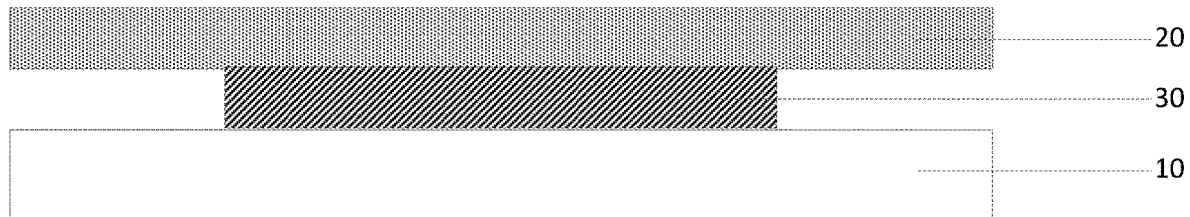
FIG. 1 is a first structural schematic diagram of a display device provided by an embodiment of the present disclosure.
Figure 2:
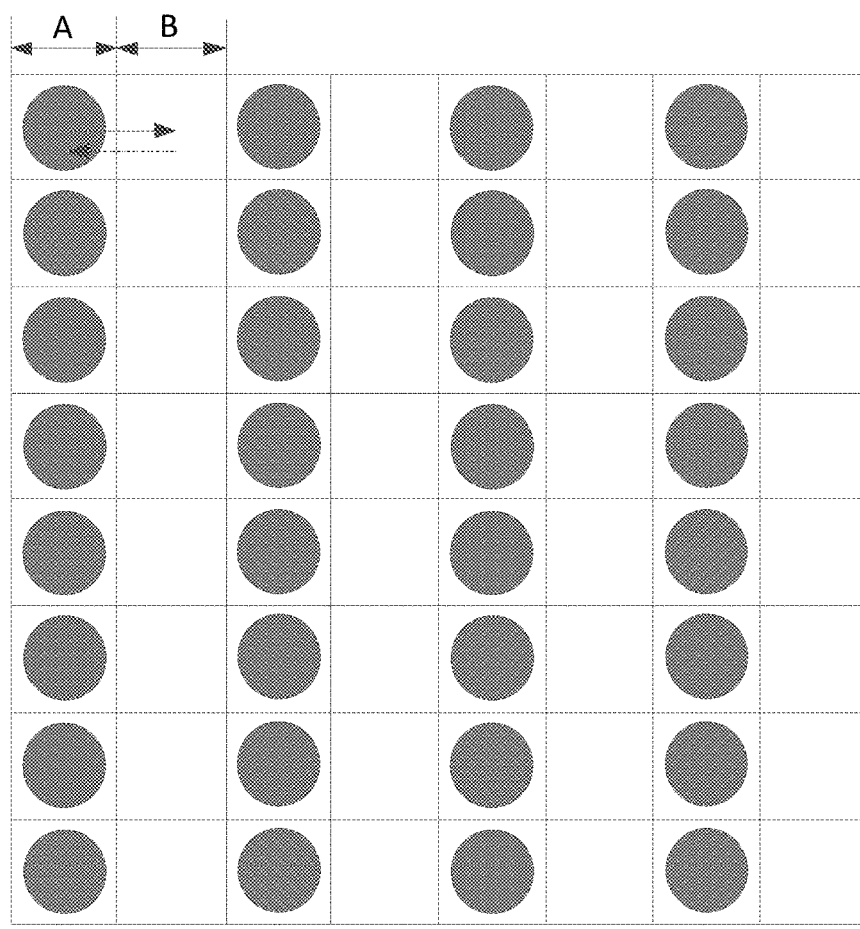
FIG. 2 is a second structural schematic diagram of the display device provided by an embodiment of the present disclosure.

An embodiment of the present disclosure provides a display device, as shown in FIG. 1, including a base substrate 10, a display panel 20 located over the base substrate 10, and a moveable structure 30 located between the base substrate 10 and the display panel 20. The moveable structure 30 is fixedly connected with the display panel 20 and is slidably connected with the base substrate 10. As shown in FIG. 2, and the display panel 20 includes a plurality of pixel areas A and non-pixel areas B located between the pixel areas A.

The moveable structure 30 is configured to control the display panel 20 to do reciprocating motion with a preset cycle while the display panel 20 performs displaying, and a distance that the display panel 20 moves in a single direction in the preset cycle is smaller than or equal to a width, in the single direction, of each of the non-pixel areas B.

The preset cycle is time spent by the display panel 20 to do reciprocating motion once, and time that the display panel 20 moves in the single direction in the preset cycle is equal to time that an image of the display panel 20 is refreshed once.

According to the display device provided by some embodiments of the present disclosure, the moveable structure fixedly connected with the display panel and slidably connected with the base substrate is arranged between the base substrate and the display panel, and while the display panel performs displaying, the moveable structure is controlled to do rapid reciprocating motion on the base substrate so as to drive the display panel to do rapid reciprocating motion; due to such an arrangement, pixels after movement may be located at the non-pixel areas before the movement, the non-pixel areas may display the same contents as those in the adjacent pixel areas within one-frame time due to a visual persistence effect of human eyes, and thus, the problem of a screen door effect appearing when an existing VR device performs displaying may be relieved; and in order to ensure that an image may be switched in time when being displayed, the image is refreshed at a certain frequency when being displayed, time that the image is refreshed once is a reciprocal of the refreshing frequency, and therefore, in order to avoid image crosstalk, the time that the moveable structure moves in a single direction in the preset cycle is set to be equal to the time that the image of the display panel is refreshed once.

It should be noted that the reciprocating motion in the embodiments of the present disclosure means that a moving object returns an initial position after doing linear motion from the initial position for several times within the preset cycle.

Figure 3:
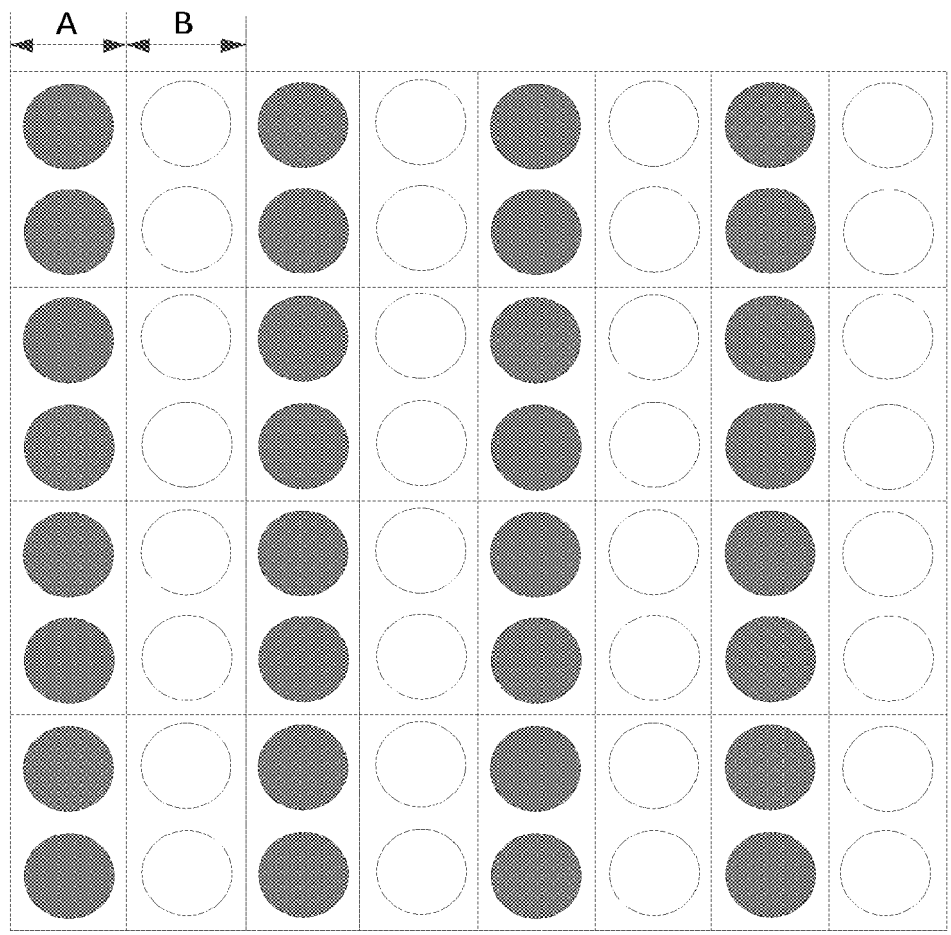
FIG. 3 is a third structural schematic diagram of the display device provided by an embodiment of the present disclosure.
Figure 4:
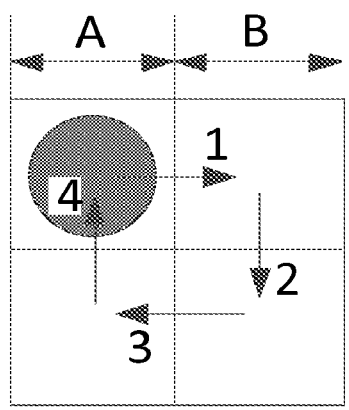
FIG. 4 is a fourth structural schematic diagram of the display device provided by an embodiment of the present disclosure.
Figure 5:
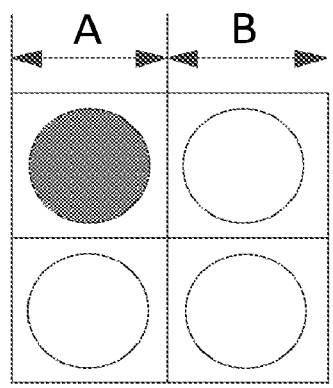
FIG. 5 is a fifth structural schematic diagram of the display device provided by an embodiment of the present disclosure.

During specific implementation, as shown in FIG. 1, FIG. 2 and FIG. 4, in some embodiments of the present disclosure, the moveable structure 30 drives the display panel 20 to move while displaying is performed, so that pixel units (represented by spheres in the pixel areas A in FIG. 2) distributed in an array in the display panel 20 also move as a whole. In FIG. 2, each column of pixel units rapidly move rightwards (shown by a solid arrow) and rapidly move leftwards (shown by a dotted arrow) within the preset cycle, a corresponding effect diagram for a rapid rightward motion is as shown in FIG. 3, spheres in the non-pixel areas B represent an effect diagram that the pixel units in the pixel areas A move towards the non-pixel areas B, namely each column of the pixel units do rapid reciprocating motion with the preset cycle; and as shown in FIG. 4, the periphery of each of the pixel areas A is provided with the non-pixel areas B, and therefore, in order to further improve the uniformity of a display image, the display panel 20 does circulatory reciprocating motion in directions indicated by an arrow 1, an arrow 2, an arrow 3 and an arrow 4 as shown in FIG. 4 within the preset cycle, a corresponding effect diagram for each motion is as shown in FIG. 5, namely the pixel units of the display panel 20 simultaneously do circulatory reciprocating motion, so that the non-pixel areas B may display the same contents as those in the adjacent pixel areas A by using the above-mentioned two motion ways, and furthermore, the problem of the screen door effect is solved. Of course, during specific implementation, each row of pixel units also can do rapid reciprocating motion within the preset cycle, the effect of which is the same as the effect that each column of pixel units do rapid reciprocating motion within the preset cycle, and the repeated parts are not described in detail herein.

Optionally, in the display device provided by some embodiments of the present disclosure, in order to increase the resolution ratio of the display device, a width of each of the pixel areas may be greater than or equal to a width of each of the non-pixel areas.

When the width of each of the pixel area is greater than or equal to the width of each of the non-pixel area, in a process that the display panel moves, the distance that the display panel moves in a single direction in the preset cycle may be equal to the width, in the single direction, of each of the non-pixel areas, namely the distance that the display panel moves in the single direction in the preset cycle may be smaller than a distance from a center of a pixel area to a center of a non-pixel area adjacent to the pixel area, so that an image displayed in the pixel areas within one-frame time not only covers the pixel areas, but also covers the non-pixel areas visually, the condition that the brightness distribution of the display panel is not uniform may be avoided, furthermore, the problem of the screen door effect appearing when the existing VR device performs displaying is solved, and crosstalk with the adjacent pixel areas may be avoided.

During specific implementation, the pixel size of the display panel is still far from the resolution ratio of the human eyes, and the non-pixel areas are incapable of emitting light, so that the user may see the pixel grids, namely the screen door effect, when using the VR device, and thus, the experience effect is affected. Therefore, in the above-mentioned display device provided by some embodiments of the present disclosure, as shown in FIG. 2, the distance that the display panel moves in a single direction in the preset cycle is equal to the distance from the center of a pixel area A to the center of an adjacent non-pixel areas B when the width of the pixel area is equal to the width of the non-pixel area, in this way, the non-pixel areas B may display the same contents as those in the pixel areas A according to the visual persistence effect of the human eyes when in displaying, the condition that the brightness distribution of the display panel is not uniform may be avoided, furthermore, the problem of the screen door effect appearing when the existing VR device performs displaying is solved, and crosstalk with the adjacent pixel areas may be avoided.

It should be noted that, as shown in FIG. 2, the non-pixel areas B of the display panel are generally much smaller than the pixel areas A, however, in order to realize clear illustration, the accompanying drawings in the embodiments of the present disclosure are illustrated with an example in which the sizes of the pixel areas A are the same as those of the non-pixel areas B so as to merely schematically describe the content of the present disclosure.

During specific implementation, in order to guarantee the motion stability of the moveable structure and ensure that the moveable structure may only do linear motion, in the above-mentioned display device provided by some embodiments of the present disclosure, the moveable structure is connected with the base substrate by a dovetail clamping slot, in this way, the moveable structure and the base substrate may be in surface contact, guaranteeing the motion stability of the moveable structure.

During specific implementation, the moveable structure drives the display panel to move, and therefore, in order to guarantee the stability of a connection between the display panel and the moveable structure, in the above-mentioned display device provided by some embodiments of the present disclosure, the moveable structure is in rigid connection with the display panel.

During specific implementation, since the pixel areas and the non-pixel areas are very small in size, in order to guarantee the motion precision, in the above-mentioned display device provided by the embodiments of the present disclosure, the moveable structure may include a piezoelectric ceramic motor.

It should be noted that the piezoelectric ceramic motor is developed based on a principle that ultrasonic standing waves are generated by a piezoelectric phenomenon, is configured as a precision motor in the field of motion control and is also called an ultrasonic motor.

Based on the same inventive concept, embodiments of the present disclosure further provides a head-mounted virtual display device including the above-mentioned display device provided by embodiments of the present disclosure.

Figure 6:
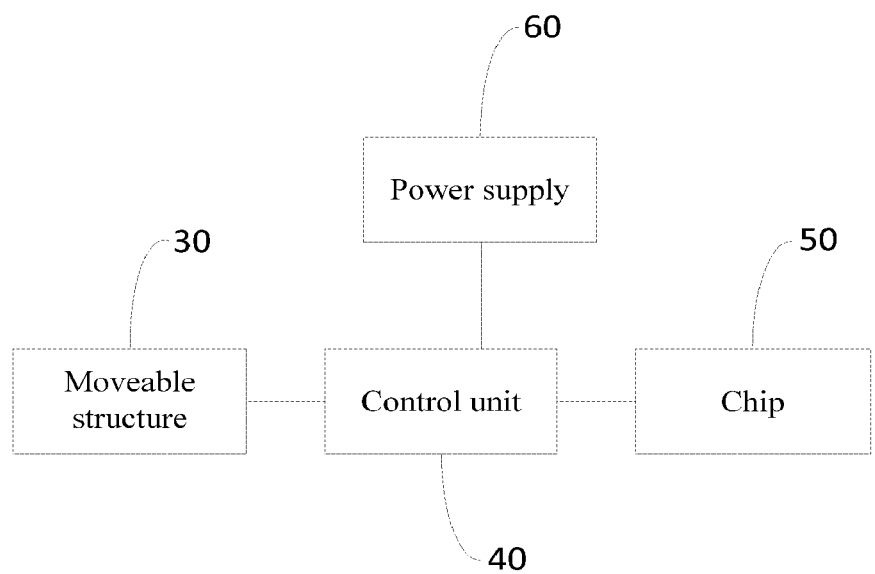
FIG. 6 is a structural schematic diagram of a head-mounted virtual display device provided by an embodiment of the present disclosure.

During specific implementation, the above-mentioned head-mounted virtual display device provided by some embodiments of the present disclosure, as shown in FIG. 6, further includes a control unit 40 connected with the moveable structure 30, and a chip 50 connected with the control unit 40.

The chip 50 is configured to send a motion instruction, specifically, the chip 50 transmits the motion instruction for indicating the moveable structure 30 to do reciprocating motion in a way as shown in FIG. 2 or FIG. 4, and the motion instruction includes a motion direction, a motion cycle and the like.

The control unit 40 is configured to receive the motion instruction and control the moveable structure 30 to do reciprocating motion with the preset cycle according to the motion instruction.

During specific implementation, the above-mentioned head-mounted virtual display device provided by some embodiments of the present disclosure, as shown in FIG. 6, further includes a power supply 60 connected with the control unit 40, and the power supply 60 is used for charging the control unit 40 so as to guarantee normal work.

Other essential components of the head-mounted virtual display device should be understood by those of ordinary skill in the art, which are not described in detail herein, and are not regarded as limitations of the present disclosure. The implementation of the head-mounted virtual display device may refer to the embodiments of the above-mentioned display device, the repeated parts are not described in detail herein.

During specific implementation, the head-mounted virtual display device may be a head-mounted virtual display helmet and the like.

Based on the same inventive concept, embodiments of the present disclosure further provides a method for controlling the display device, including: in a display phase, the display panel is controlled to do reciprocating motion with a preset cycle, and a distance that the display panel moves in a single direction in the preset cycle is smaller than or equal to a width of each of the non-pixel areas in the single direction. The preset cycle is time spent by the display panel to do reciprocating motion once, and time that the display panel moves in the single direction in the preset cycle is equal to time that an image of the display panel is refreshed once.

According to the method for controlling the display device, provided by some embodiments of the present disclosure, the moveable structure is controlled to do rapid reciprocating motion on the base substrate so as to drive the display panel to do rapid reciprocating motion while the display panel performs displaying; due to such an arrangement, pixels after movement may be located at the non-pixel areas before the movement, the non-pixel areas may display the same contents as those in the adjacent pixel areas within one-frame time due to a visual persistence effect of human eyes, and thus, the problem of the screen door effect appearing when an existing VR device performs displaying may be relieved; and in order to ensure that an image may be switched in time when being displayed, the image is refreshed at a certain frequency when being displayed, time that the image is refreshed once is a reciprocal of the refreshing frequency, and therefore, in order to avoid image crosstalk, the time that the moveable structure moves in the signal direction in the preset cycle is set to be equal to the time that the image of the display panel is refreshed once.

During specific implementation, in the above-mentioned method provided by some embodiments of the present disclosure, as shown in FIG. 2, the display panel (corresponding to each column of pixel units) is controlled to do linear reciprocating motion along a first direction (indicated by a solid arrow) and a direction (indicated by a dotted arrow) opposite to the first direction within the preset cycle. Therefore, the non-pixel areas B may display the same contents as those in the pixel areas A according to the visual persistence effect of the human eyes when in displaying, and thus, the problem of the screen door effect appearing when the existing VR device performs displaying is solved.

During specific implementation, when reciprocating motion is performed in a motion way as shown in FIG. 2, pixels are refreshed at a certain frequency when an image is displayed, f represents a refreshing frequency, namely the time that the image is refreshed once is 1/f; in order to ensure that the image may be switched in time, namely in order to avoid image crosstalk, the motion cycle (namely the above-mentioned preset cycle $T_1$) of the display panel is required to be matched with the refreshing frequency f of the image; the display panel moves twice within the preset cycle, and the image is required to be refreshed once every time when the display panel moves, namely the time that the display panel moves once within the preset cycle is equal to the time that the image is refreshed once; and the display panel moves twice within the preset cycle in the present embodiment, so that the condition that $1/f=T_1/2$ is required to be met. Therefore, in the above-mentioned method provided by some embodiments of the present disclosure, the preset cycle $T_1$ is twice as long as the time 1/f that the image of the display panel is refreshed once.

During specific implementation, the periphery of each of the pixel areas is provided with the non-pixel areas, and therefore, in order to further improve the uniformity of a display image, in the above-mentioned method provided by some embodiments of the present disclosure, as shown in FIG. 4, the display panel (corresponding to each of the pixel units) is controlled to do linear reciprocating motion along an annular region formed by a first direction (indicated by a horizontal arrow 1 in FIG. 4), a second direction (indicated by a vertical arrow 2 in FIG. 4), a direction (indicated by a horizontal arrow 3 in FIG. 4) opposite to the first direction and a direction (indicated by a vertical arrow 4 in FIG. 4) opposite to the second direction within the preset cycle. A corresponding effect diagram for each motion corresponding to FIG. 4 is as shown in FIG. 5, and finally, the pixel units return to an initial position within the preset cycle.

During specific implementation, when reciprocating motion is performed in a motion way as shown in FIG. 4, pixels are refreshed at a certain frequency when an image is displayed, f represents a refreshing frequency, namely the time that the image is refreshed once is 1/f; in order to ensure that the image may be switched in time, namely in order to avoid image crosstalk, the motion cycle (namely the above-mentioned preset cycle $T_2$) of the display panel is required to be matched with the refreshing frequency f of the image; the display panel moves four times within the preset cycle, and the image is required to be refreshed once every time when the display panel moves, namely the time that the display panel moves once within the preset cycle is equal to the time that the image is refreshed once; the display panel moves four times within the preset cycle in the present embodiment, so that the condition that $1/f=T_2/4$ is required to be met. Therefore, in the above-mentioned method provided by the embodiment of the present disclosure, the preset cycle $T_2$ is four times as long as the time 1/f that the image of the display panel is refreshed once.

During specific implementation, in the above-mentioned method provided by some embodiments of the present disclosure, the preset cycle is 10 ms or 20 ms.

During specific implementation, in the above-mentioned method provided by some embodiments of the present disclosure, the time that the image is refreshed once is 8.3 ms-16.7 ms.

During specific implementation, in order to guarantee the uniformity of the display image, in the above-mentioned method provided by some embodiments of the present disclosure, as shown in FIG. 2, the distance that the display panel moves once is smaller than or equal to the distance from the center of a pixel area A to the center of an adjacent non-pixel area B, so that the non-pixel areas B may display the same contents as those in the pixel areas A according to the visual persistence effect of the human eyes when in displaying, the condition that the brightness distribution of the display panel is not uniform may be avoided, the problem of the screen door effect appearing when the existing VR device performs displaying is solved, and a crosstalk phenomenon of images displayed in the adjacent pixel areas may be avoided.

According to the display device, the method for controlling the display device and the head-mounted virtual display device provided by embodiments of the present disclosure, the moveable structure fixedly connected with the display panel and slidably connected with the base substrate is arranged between the base substrate and the display panel, and the moveable structure is controlled to do rapid reciprocating motion on the base substrate so as to drive the display panel to do rapid reciprocating motion while the display panel performs displaying; due to such an arrangement, the pixels after movement may be located at the non-pixel areas before the movement, the non-pixel areas may display the same contents as those in the adjacent pixel areas within one-frame time due to the visual persistence effect of the human eyes, and thus, the problem of the screen door effect appearing when the existing VR device performs displaying may be relieved; and in order to ensure that the image may be switched in time when being displayed, the image is refreshed at a certain frequency when being displayed, time that the image is refreshed once is a reciprocal of the refreshing frequency, and therefore, in order to avoid image crosstalk, the time that the moveable structure moves once within the preset cycle is set to be equal to the time that the image of the display panel is refreshed once.

Apparently, those skilled in the art can make various changes and modifications on the present disclosure without departing from the spirit and scope of the present disclosure. Thus, the present disclosure is also intended to encompass these changes and modifications if such changes and modifications of the present disclosure are within the scope of the claims of the present disclosure and equivalent technologies thereof.

What is claimed is:

1. A display device, comprising: a base substrate; a display panel, located over the base substrate; and a moveable structure, located between the base substrate and the display panel, fixedly connected with the display panel, and slidably connected with the base substrate; wherein the display panel comprises: a plurality of pixel areas; and non-pixel areas located between the plurality of pixel areas; and the moveable structure is configured to control the display panel to do reciprocating motion with a preset cycle while the display panel performs displaying; wherein, a distance that the display panel moves in a single direction in the preset cycle is smaller than or equal to a width, in the single direction, of each of the non-pixel areas; the preset cycle is time spent by the display panel to do reciprocating motion once, and time that the display panel moves in the single direction in the preset cycle is equal to time that an image of the display panel is refreshed once;

wherein: the distance that the display panel moves in the single direction in the preset cycle is equal to a distance from a center of a pixel area to a center of a non-pixel area adjacent to the pixel area; and the pixel area and the non-pixel area adjacent to the pixel area display same content within one-frame time due to a visual persistence effect of human eyes.

2. The display device according to claim 1, wherein a width of each of the pixel areas is greater than or equal to the width of each of the non-pixel areas.

3. The display device according to claim 2, wherein the distance that the display panel moves in the single direction in the preset cycle is smaller than or equal to a distance from a center of a pixel area to a center of a non-pixel area adjacent to the pixel area.

4. The display device according to claim 1, wherein the moveable structure is connected with the base substrate by a dovetail clamping slot.

5. The display device according to claim 1, wherein the moveable structure is in rigid connection with the display panel.

6. The display device according to claim 1, wherein the moveable structure comprises a piezoelectric ceramic motor.

7. A head-mounted virtual display device, comprising the display device according to claim 1.

8. The head-mounted virtual display device according to claim 7, further comprising:
a control unit, connected with the moveable structure; and
a chip, connected with the control unit,
wherein
the chip is configured to send a motion instruction; and
the control unit is configured to:
receive the motion instruction; and
control the moveable structure to do reciprocating motion with the preset cycle in response to the motion instruction.

9. A method for controlling the display device according to claim 1, comprising:
in a display phase, controlling the display panel to do reciprocating motion with the preset cycle;
wherein,
the distance that the display panel moves in a single direction in the preset cycle is smaller than or equal to a width, in the single direction, of each of the non-pixel areas;
the preset cycle is the time spent by the display panel to do reciprocating motion once, and
the time that the display panel moves in the single direction in the preset cycle is equal to the time that the image of the display panel is refreshed once.

10. The method according to claim 9, wherein the display panel is controlled to do linear reciprocating motion along a first direction and a direction opposite to the first direction with the preset cycle.

11. The method according to claim 10, wherein the preset cycle is twice as long as the time that the image of the display panel is refreshed once.

12. The method according to claim 9, wherein the display panel is controlled to do reciprocating motion along a closed region formed by a first direction, a second direction, a direction opposite to the first direction and a direction opposite to the second direction with the preset cycle.

13. The method according to claim 12, wherein the preset cycle is four times as long as the time that the image of the display panel is refreshed once.

14. The method according to claim 9, wherein the distance that the display panel moves in the single direction in the preset cycle is smaller than or equal to a distance from a center of a pixel area to a center of a non-pixel area adjacent to the pixel area.

15. The method according to claim 9, wherein the preset cycle is 10 ms or 20 ms.

16. The method according to claim 11, wherein the time that the image is refreshed once ranges from 8.3 ms to 16.7 ms.

* * * * *